United States Patent [19]

Akiyama et al.

[11] Patent Number: 5,754,263
[45] Date of Patent: May 19, 1998

[54] LIQUID CRYSTAL DISPLAY APPARATUS WITH SILICON OR SILICON-GERMANIUM THIN FILMS COVER SPACES BETWEEN ELECTRODES

[75] Inventors: Hisashi Akiyama; Shuji Miyoshi, both of Kashiwa, Japan

[73] Assignees: Sharp Kabushiki Kaisha, Osaka, Japan; The Secretary of State for Defence in Her Britannic Majesty's Government of the United Kingdom of Great Britain and Northern Ireland, Farnborough, United Kingdom

[21] Appl. No.: 740,746

[22] Filed: Nov. 1, 1996

[30] Foreign Application Priority Data

Nov. 6, 1995 [JP] Japan ................................ 7-287672

[51] Int. Cl.⁶ .......................... G02F 1/1333; G02F 1/13
[52] U.S. Cl. ........................ 349/110; 349/122; 349/172
[58] Field of Search ........................ 349/110, 122, 349/172

[56] References Cited

U.S. PATENT DOCUMENTS

| 4,995,702 | 2/1991 | Arguga ............................ 349/181 |
| 5,120,623 | 6/1992 | Brosig et al. ..................... 349/110 |
| 5,419,991 | 5/1995 | Segawa ........................... 349/156 |
| 5,499,125 | 3/1996 | Kim et al. ........................ 349/110 |

FOREIGN PATENT DOCUMENTS

| 0271313 | 6/1988 | European Pat. Off. . |
| 3204617 | 9/1991 | Japan . |
| 3223810 | 10/1991 | Japan . |
| 6-281923 | 10/1994 | Japan . |
| 2240204 | 7/1991 | United Kingdom . |
| 2279797 | 1/1995 | United Kingdom . |

OTHER PUBLICATIONS

"Submicrosecond Bistable Electra-Optic Switching in Liquid Crystals" (Noel A. Clark et al. Appl. Phys. Lett. 36(11), 1 Jun. 1980 pp. 899–901).

"FLCD Showing High Contrast and High Luminance" (Heinz Rieger et al. SID 91 Digest pp. 396–399), 1991, No Month.

Search Report for Application No. GB 9623135.2; dated Jan. 21, 1997.

*Primary Examiner*—William L. Sikes
*Assistant Examiner*—Julie Ngo

[57] ABSTRACT

A liquid crystal display element using ferroelectric liquid crystal includes a light blocking thin film which is formed by silicon or silicon-germanium solid solution by evaporation between electrodes formed by an ITO film placed in a striped pattern on a surface of a transparent glass substrate so that the thin film does not protrude from the ITO film surface. This thin film shades a non-pixel region as a black matrix.

20 Claims, 9 Drawing Sheets

LIQUID CRYSTAL DISPLAY APPARATUS WITH SILICON OR SILICON-GERMANIUM THIN FILMS COVER SPACES BETWEEN ELECTRODES

FIELD OF THE INVENTION

The present invention relates to liquid crystal display elements using ferroelectric liquid crystals, and more particularly relates to ferroelectric liquid crystal display elements having a black matrix for shading non-pixel regions (regions other than pixels), and a process for fabricating the same.

BACKGROUND OF THE INVENTION

A liquid crystal display device using ferroelectric liquid crystals (see N. A. Clark and S. T. Lagerwall: Appl. Phys. Lett. 36 (1980), pp. 899–901) can display pixels of higher definition and higher capacity compared to a conventional simple matrix liquid crystal display device because of excellent characteristics of the ferroelectric liquid crystals, such as memory characteristics, fast response, and wide viewing angle.

Figure 5:
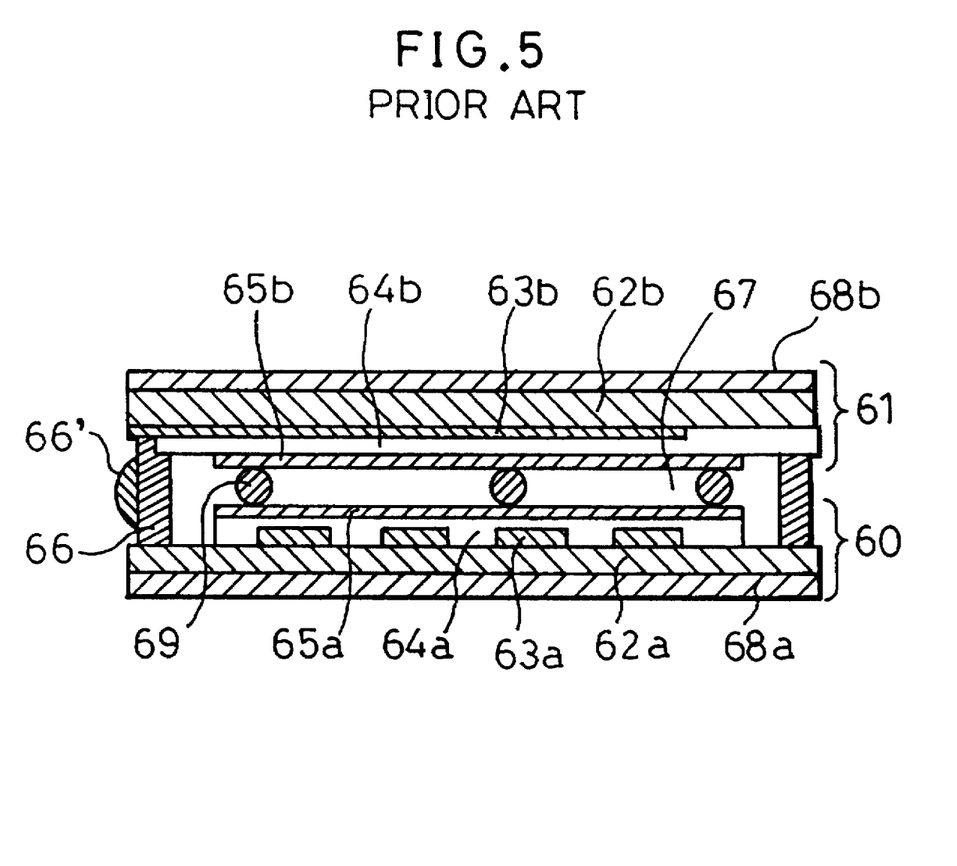
FIG. 5 is a cross section showing the structure of an example of conventional liquid crystal display device.

FIG. 5 shows a schematic cross section of an example of a conventional liquid crystal display device using ferroelectric liquid crystals. This conventional liquid crystal display device includes two pieces of substrates 60 and 61 that face each other, and a ferroelectric liquid crystal 67 filled between the substrates 60 and 61.

The substrates 60 and 61 include transparent glass substrates 62a and 62b, respectively. A plurality of transparnet signal electrodes 63a made of, for example, indium tin oxide (generally called ITO), are placed parallel to each other on a surface of the glass substrate 62a. Further, a transparent insulation film 64a made of, for example, silicon oxide ($SiO_2$), is layered on the signal electrodes 63a. On the other hand, a plurality of transparent scanning electrodes 63b made of, for example, ITO are, placed parallel to each other on a surface of the glass substrate 62b. The scanning electrodes 63b are covered with a transparent insulation film 64b formed by, for example, $SiO_2$. The glass substrates 62a and 62b are disposed so that the signal electrodes 63a and the scanning electrodes 63b formed thereon cross each other at right angles.

Alignment films 65a and 65b which underwent a uniaxial alignment process such as rubbing treatment are formed on the insulation films 64a and 64b, respectively. Materials to be used for the alignment films 65a and 65b include films made of organic polymers such as polyimides, nylon and polyvinyl alcohol, and films formed by depositing $SiO_2$ by oblique evaporation. When a film of organic polymer is used as the alignment films, 65a and 65b, the alignment process is usually performed so that liquid crystal molecules are aligned substantially parallel to the substrates 60 and 61.

The two pieces of substrates 60 and 61 are fastened together with a sealing agent 66 so that a portion to be an inlet remains unsealed. The inlet is sealed with a sealing agent 66' after injecting the ferroelectric liquid crystal 67 into a space between the alignment films 65a and 65b. Additionally, layered on the external surfaces of the two pieces of glass substrates 62a and 62b are two pieces of polarizing plates 68a and 68b which are positioned so that the polarization axes thereof cross each other at right angles. If the display area is large, spacers 69 are placed so as to arrange the substrates 60 and 61 to be parallel and face each other with a predetermined cell thickness.

Figure 6:
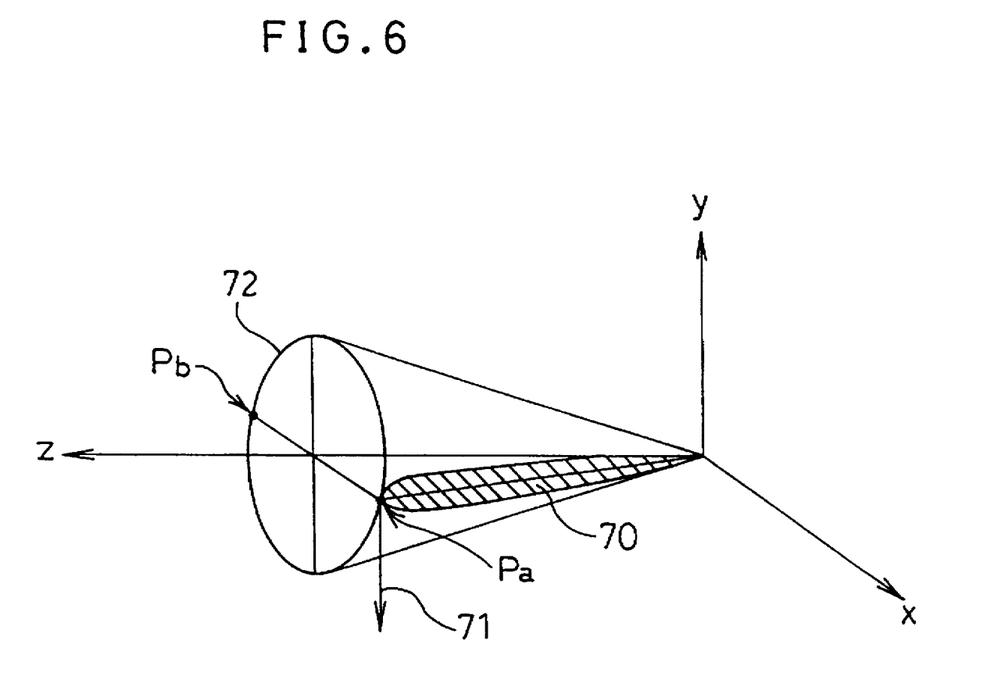
FIG. 6 is a view explaining an electric field response of ferroelectric liquid crystal molecules.

As illustrated in FIG. 6, a molecule 70 of ferroelectric liquid crystals has spontaneous polarization 71 in a direction perpendicular to the long axis of the molecule 70, receives a force proportional to the vector product of the spontaneous polarization 71 and an electric field produced by a driving voltage applied by the transparent electrodes 63a and 63b. and moves on the surface of a conical locus 72.

Figure 7:
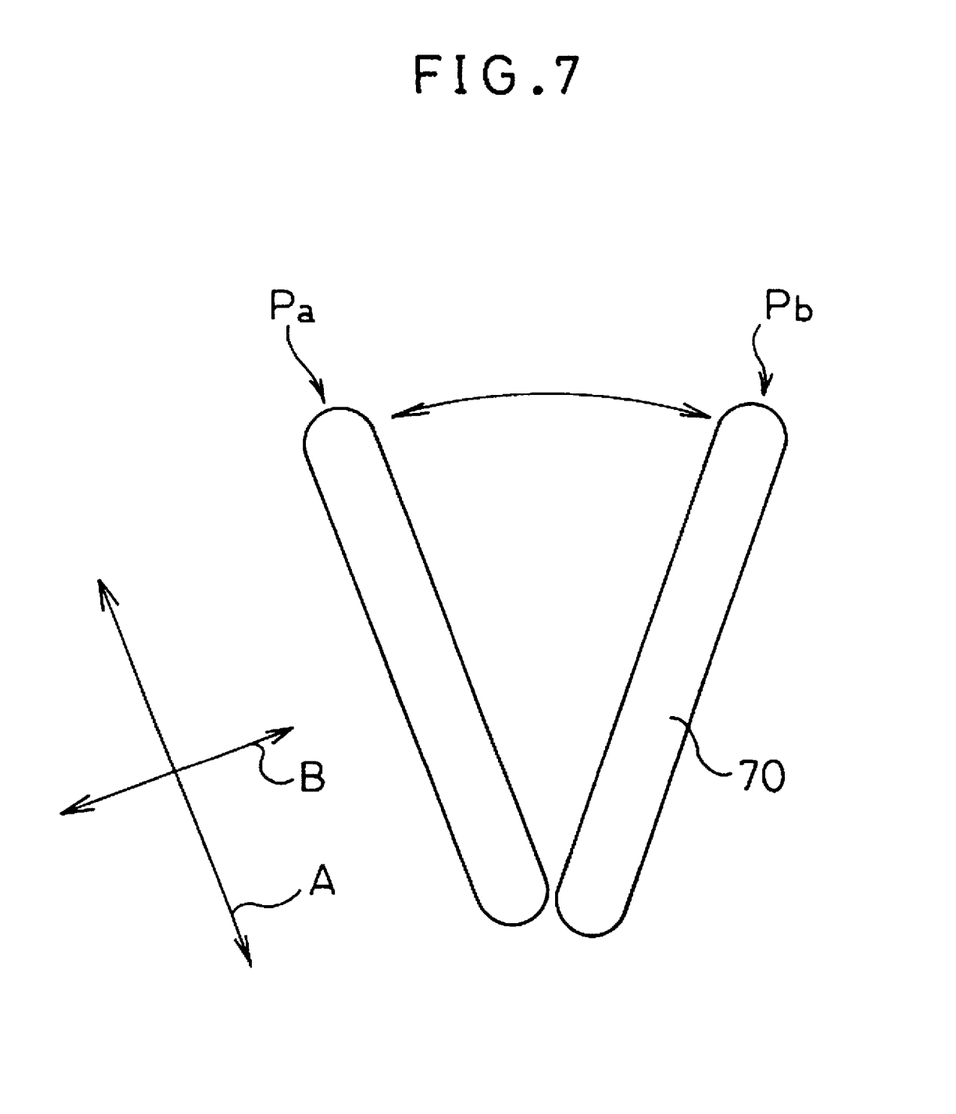
FIG. 7 is a view explaining how ferroelectric liquid crystal molecules are switched between bistable states.

Therefore, as illustrated in FIGS. 6 and 7, it looks as if the molecule 70 of the ferroelectric liquid crystals is switched between positions $P_a$ and $P_b$ on the locus 72. Consequently, for example, if the polarizing plates 68a and 68b are placed so that the polarization axes thereof are aligned in the directions of arrows A and B shown in FIG. 7, respectively, a dark field is produced when the molecule 70 is in the position $P_a$, and a bright field is produced by double refraction when the molecule 70 is in the position $P_b$.

Since the aligned states of the liquid crystal molecules at the positions Pa and Pb are equivalent with regard to the elastic energy, when the liquid crystal molecules are aligned in either of the states of the positions $P_a$ and Pb by the application of an electric field, an optical state, i.e., a bright field or dark field, corresponding to the aligned state is retained even after the removal of the electric field. Namely, a so-called memory effect is exhibited. The memory effect is a characteristic that is not present in nematic liquid crystals and permits higher definition display of pixels of higher capacity, compared to a conventional simple matrix system, as well as high-speed response due to spontaneous polarization.

Figure 8:
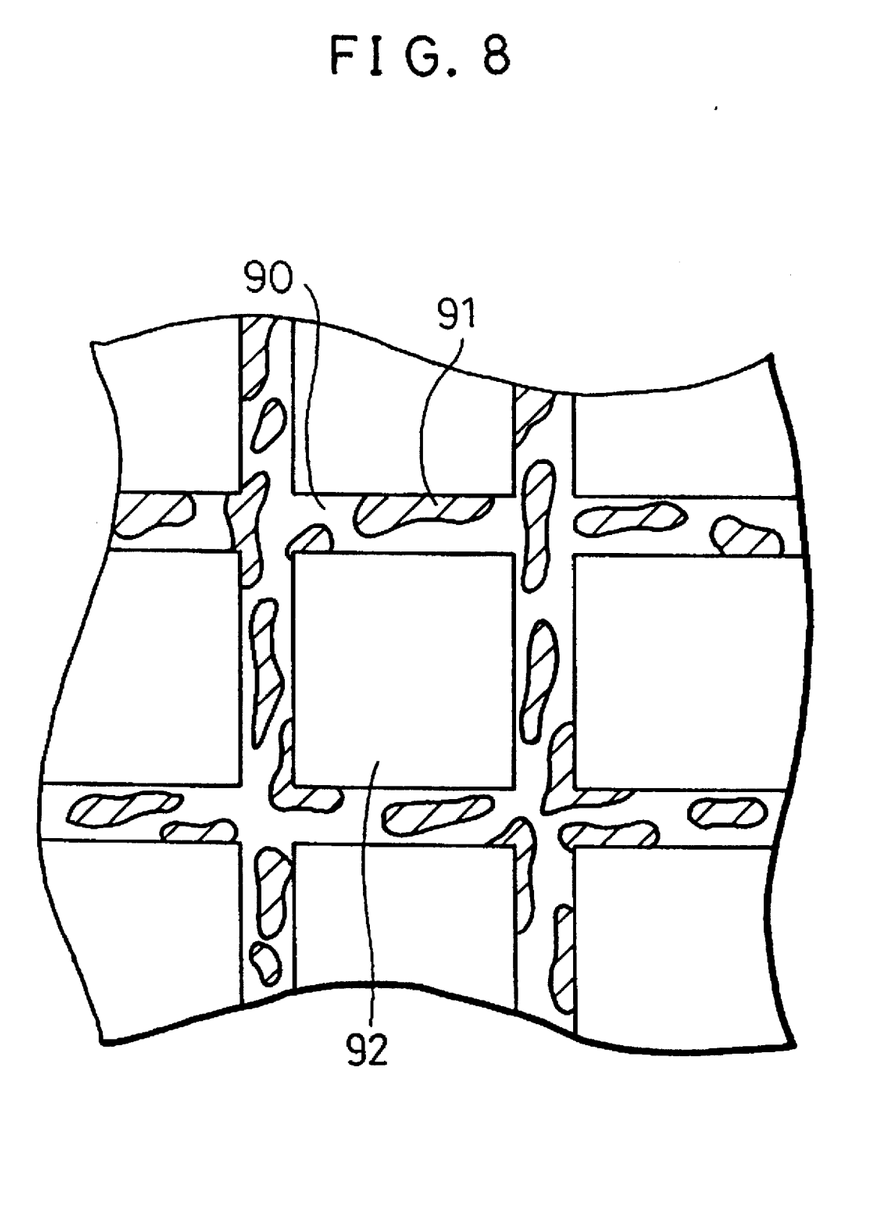
FIG. 8 is a view explaining a non-uniformity of the display state in a non-pixel region of the conventional liquid crystal display device.

Although the memory effect of the ferroelectric liquid crystals is extremely effective as mentioned above, it has the following problem. Specifically, since the aligned states of the molecule 70 at the positions $P_a$ and $P_b$ shown in FIG. 7 have equivalent stability as shown in FIG. 8, both of bright areas 90 through which light can pass and dark areas 91 through which light cannot pass are present in regions other than pixel regions 92, i.e., non-pixel regions where the liquid crystal molecules can not be controlled to align in either of the positions because a driving voltage is not applied. As a result, the contrast of a liquid crystal display device is lowered. In nematic liquid crystals which do not have memory characteristics and are stable only in one kind of molecular aligned state when no electric field is present, the above-mentioned problem does not occur.

Figure 9:
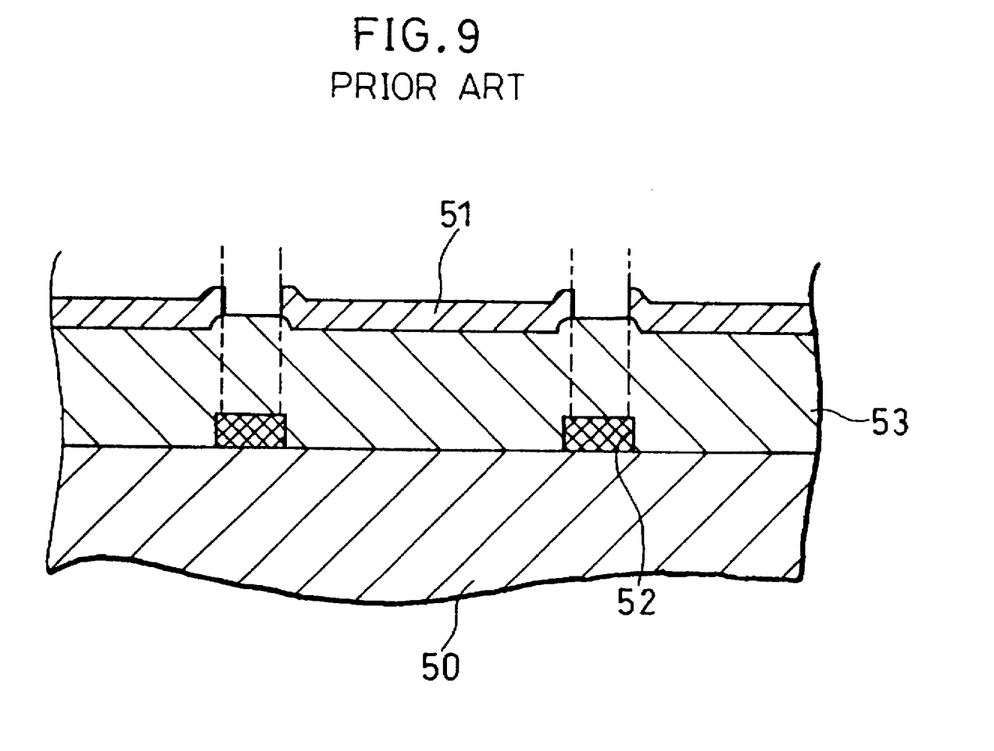
FIG. 9 is a cross section showing the structure of another example of conventional liquid crystal display device.

In order to solve the problem, in a prior art, as illustrated in FIG. 9, a metal thin film 52 having light blocking properties is formed on a transparent substrate 50, an insulation layer 53 is placed thereon, and then ITO electrodes 51 are formed on the insulation layer 53 (see H. Rieger et al.: SID 91 DIGEST, pp. 396). The structure like the metal thin film 52 that coercively blocks light from falling on the non-pixel region is generally called "a black matrix".

For instance, Japanese Publication for Unexamined Patent Application (Tokukaihei) No. 3-223810 discloses a process for forming a black matrix pattern by patterning the ITO electrodes using a photoresist, depositing a film of an organic light blocking substance thereon without removing the photoresist, and then lifting off the photoresist. This process is designed for preventing displacement of the patterns of black matrix and ITO electrodes.

When the black matrix is formed by a metal thin film, even if the metal thin film is as thin as about 200 nm, it can sufficiently function as a back matrix. However, if the insulation characteristic of the insulation layer is not perfect, a leakage current occurs between adjacent ITO electrodes, and therefore the pixel region may not be driven.

As pointed out by Rieger et al., in order to prevent displacement of the patterns of the metal thin film 52 as black matrix and the ITO electrodes 51, it is necessary to arrange the metal thin film 52 to be slightly wider than a distance between adjacent ITO electrodes 51 as shown in FIG. 9. In this case, a gap is produced at a section where the ITO electrode 51 overlaps the metal thin film 52, and remains to the last. It is known that such gaps on the surface cause vicious effects not only on the non-pixel region but also on the alignment and switching characteristics of ferroelectric liquid crystals in the pixel region.

On the other hand, in a conventional method like a method for forming a pattern of black matrix by a lift off process as disclosed in the Japanese Publication for Unexamined Patent Application (Tokukaihei) No. 3-223810 above, black polymers are used as a material for a black matrix so as to prevent an electrical leakage to the ITO electrodes. In this case, in order to eliminate the gap by arranging the surface of the black matrix and the surface of the ITO electrodes to be level with each other, it is necessary to consider a shrinkage of the black polymers during heat treatment.

However, since the conditions including the shrinkage of the black polymers vary depending on the film thickness of the applied black polymers and the temperature of the heat treatment, it is difficult to render the black matrix surface and the ITO surface level with each other, and a gap tends to be produced. Even when the gap is as small as that can be ignored in nematic liquid crystals, it causes vicious effects not only on the non-pixel region but also on the alignment and switching characteristics of ferroelectric liquid crystals in the pixel region. In short, the gap prevents the realization of a uniform display with high contrast.

SUMMARY OF THE INVENTION

It is an object of the present invention to provide a ferroelectric liquid crystal display element capable of achieving a uniform display with high contrast by realizing a black matrix that does not cause vicious effects on the alignment and switching characteristics of ferroelectric liquid crystals.

In order to achieve the above object, a liquid crystal display element of the present invention includes:

a pair of transparent substrates respectively having a plurality of parallel transparent electrodes;

a ferroelectric liquid crystal sandwiched between the pair of transparent substrates; and a thin film layer formed by silicon or a silicon-germanium solid solution to cover spaces between adjacent transparent electrodes on a surfaces of the transparent substrate.

Since the ferroelectric liquid crystal has bistability, a light transmitting portion and a light blocking portion are present at the same time in a non-pixel region of the ferroelectric liquid crystal, i.e., a region which is not controlled by the transparent electrodes. Therefore, in order to enhance the contrast, it is necessary to shade the space between adjacent transparent electrodes as the non-pixel region. In this structure, the thin film layer is formed between adjacent transparent electrodes on the transparent substrate surface, and it functions as a black matrix for shading the non-pixel region. Accordingly, it is possible to provide a liquid crystal display element capable of achieving a uniform display with high contrast.

The resistivity of the thin film layer formed by silicon or silicon-germanium solid solution is about $3 \times 10^5 \Omega \cdot cm$ near room temperature. It is known from this value that the above-mentioned thin film layer is slightly inferior, in the insulation characteristics, to an insulating film formed by an insulating material such as silicon oxide ($SiO_2$). However, this value is sufficiently high for causing a leakage current between adjacent transparent electrodes. Namely, by providing the thin film layer, it is possible to prevent a leakage current which causes vicious effects on the driving characteristics of the liquid crystal element without placing an insulating film between the black matrix and the transparent electrodes. Consequently, a liquid crystal display element of excellent display quality can be obtained without deteriorating the alignment and switching characteristics of ferroelectric liquid crystals.

In the above-mentioned liquid crystal display element, it is preferred to arrange the surface level of the thin film layer with respect to the surface of the transparent substrate to be not higher than the surface level of the transparent electrodes with respect to the surface of transparent substrate. With this arrangement, the thin film layer, i.e., the black matrix, does not protrude from the transparent electrodes, thereby preventing a gap on the transparent substrate surface. As a result, it is possible to prevent the black matrix from causing vicious effects on the alignment and switching characteristics of ferroelectric liquid crystals in the pixel region, thereby achieving a liquid crystal display element with excellent display quality.

In order to achieve the above object, a process for fabricating a liquid crystal display element of the present invention, includes steps:

(a) forming a transparent electrode material film on a transparent substrate;

(b) forming an electrode pattern on the electrode material film by a photoresist;

(c) forming electrodes by etching;

(d) forming a silicon film on the transparent substrate having the electrodes with the photoresist remaining thereon; and (e) removing the photoresist together with the silicon film thereon.

This process enables the formation of the silicon film in a section of the transparent substrate where the transparent electrodes are not formed. Namely, it is possible to easily form the transparent electrodes and the silicon film functioning as the black matrix without causing displacement of patterns thereof. Consequently, a liquid crystal display element capable of achieving a uniform display with high contrast can be easily provided.

In addition, if the silicon film is formed by depositing silicon by evaporation in step (d), the film thickness of the silicon film can be easily controlled so that the gap between the surfaces of the silicon film and the transparent electrodes is not grater than, for example, about 30 nm. This prevents the silicon film functioning as the black matrix from protruding from the transparent electrodes and causing vicious effects on the alignment and switching characteristics of liquid crystals. It is thus possible to provide a liquid crystal display element with excellent display quality. The above-mentioned process also exhibits the same effects with the use of a silicon-germanium solid solution film instead of the silicon film.

For a fuller understanding of the nature and advantages of the invention, reference should be made to the ensuing detailed description taken in conjunction with the accompanying drawings.

DESCRIPTION OF THE PREFERRED EMBODIMENTS

[Embodiment 1]

The following description will discuss one embodiment of the present invention with reference to FIGS. 1(a) to 1(d) and FIG. 2.

As to be described below, a black matrix is formed on a glass substrate in a liquid crystal display device of this embodiment of the present invention.

Figure 1A:
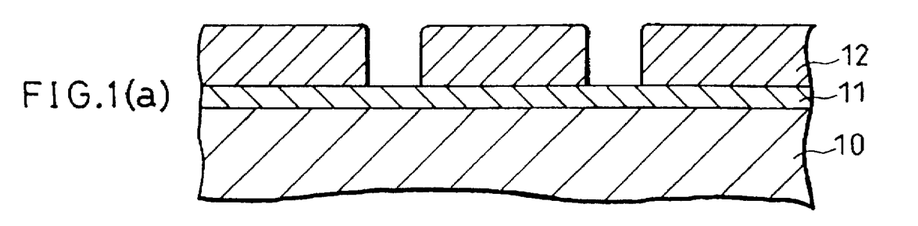
FIGS. 1(a) to 1(d) are cross sections showing the structure of a substrate in a liquid crystal display device of one embodiment of the present invention according to the order of manufacturing steps.

As illustrated in FIG. 1(a), an ITO film 11 with a thickness of 400 nm is formed over the entire surface of a transparent glass substrate 10 (transparent substrate) of the liquid crystal display device by depositing indium tin oxide (ITO) by sputtering or electron-beam evaporation. As the glass substrate 10, for example, a glass substrate "7059" (136×136× 1.1 mm) available from Corning Co., Ltd. may be used.

A photoresist pattern 12 is formed by spincoating a photoresist on the glass substrate 10 and performing photolithography using a photographic mask designed for ITO electrode formation and an ultraviolet-ray exposure device. As the photoresist, for example, TSMR-8800 available from TOKYO OHKA KOGYO Co., Ltd. may be used.

Figure 1B:
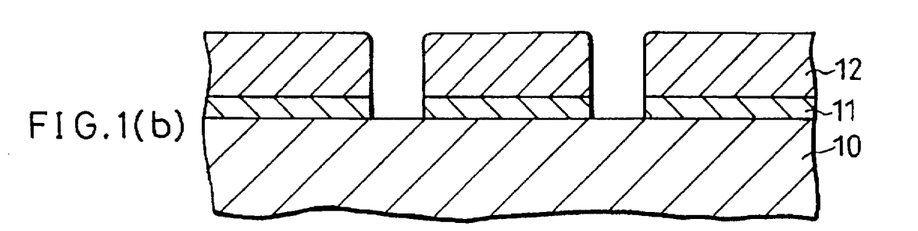

Subsequently, etching is performed by dipping the glass substrate 10 in an etching agent containing 47 percent HBr at a temperature of 35° C. for ten minutes. As a result, transparent electrodes are formed by the ITO film 11 in a striped pattern as shown in FIG. 1(b). In this case, the width of each transparent electrode is 200 μm, a length in a longitudinal direction is 96 mm, and the distance between adjacent transparent electrodes, i.e., the width of the etched portion is 15 μm.

Figure 1C:
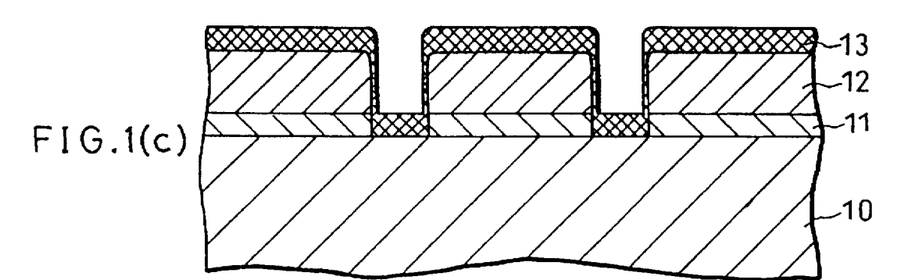

Thereafter, the glass substrate 10 is washed with demineralized water without separating the photoresist pattern 12, and then dried. Next, by depositing silicon by evaporation using an electron-beam evaporation device, a silicon film 13 is formed as shown in FIG. 1(c). As the silicon, for example, a silicon with 99.999 percent purity, produced by Kojundo Chemical Laboratory Co., Ltd., may be used. The evaporation is carried out in the conditions: the substrate temperature is between 100° and 120° C., and the film forming rate is between 30 and 50 nm per minute, so as to control the thickness of the deposited silicon film 13 to be substantially equal to the thickness of the ITO film 11.

Figure 1D:
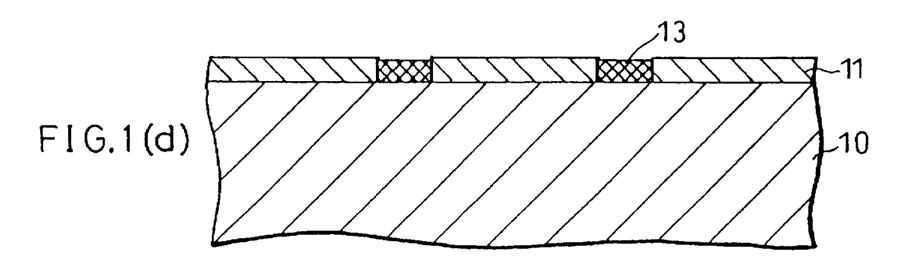

Next, the photoresist pattern 12 and the silicon film 13 thereon are lifted off together by dipping the glass substrate 10 having thereon the silicon film 13 in an aqueous 2-percent sodium hydroxide solution and applying ultrasonic waves. Through the above-mentioned processes, as illustrated in FIG. 1(d), a black matrix made of the silicon film 13 is formed in a region between electrodes formed by the ITO film 11 on the glass substrate 10.

Figure 2:
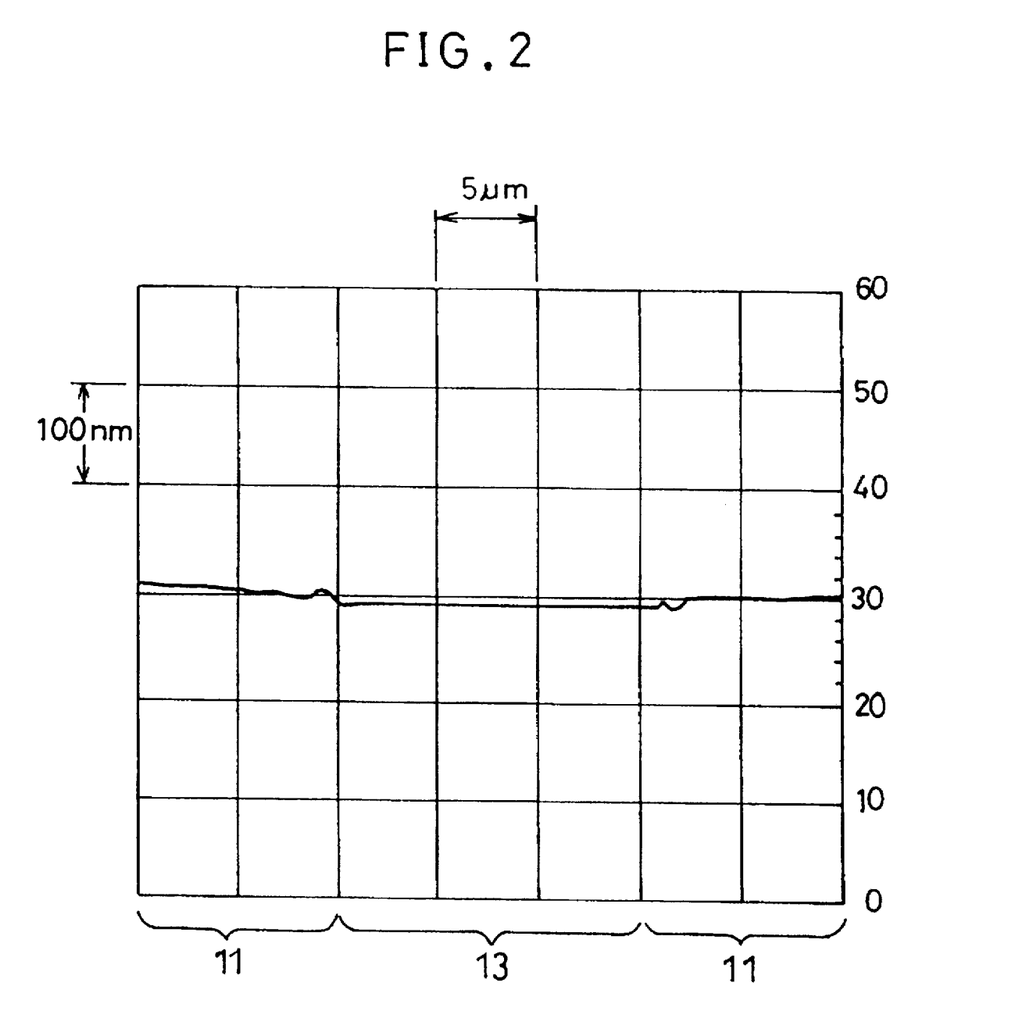
FIG. 2 is a view explaining the results of a measurement of the substrate surface of the liquid crystal display device carried out by a gap measure.

The gap between the surface of the ITO film 11 and the surface of the silicon film 13 as the black matrix thus formed was measured using a gap measure. As shown in FIG. 2, the gap was within a range of 20 and 30 nm. It is necessary to form the silicon film 13 so that the surface thereof is level with or lower than the surface of the ITO film 11, i.e., the silicon film 13 does not protrude from the surface of the ITO film 11. This is required to prevent the alignment of the ferroelectric liquid crystals in a pixel region from being disorderly by a protrusion of the black matrix formed by the silicon film 13. If the surface of the silicon film 13 protrudes from the surface of the ITO film 11, the gap due to the protrusion of the silicon film 13 can be eliminated by again dipping the glass substrate 10 in the aqueous 2-percent sodium hydroxide solution and applying ultrasonic waves to gradually grind the silicon film 13.

An insulting film made of, for example, silicon oxide (SiO$_2$) or silicon nitride (SiN) and an alignment film made of polyimide are successively formed on the substrate thus fabricated, and a uniaxial alignment process is performed by rubbing the alignment film. By placing another piece of substrate fabricated in the same manner as above to face the above-mentioned substrate and injecting ferroelectric liquid crystals therebetween, a liquid crystal display device can be fabricated.

As described above, in the liquid crystal display device of this embodiment, since the silicon film 13 placed between the transparent electrodes made of the ITO film 11 functions as the black matrix and the non-pixel region with low contrast is shaded, it is possible to prevent the contrast of display as a whole from deteriorating and realize a uniform display state. Moreover, since the resistivity between adjacent ITO electrodes is about 1 MΩ, it is possible to reduce the occurrence of leakage current which causes vicious effects on the driving characteristics of the liquid crystal display device. The above-mentioned configuration achieves a liquid crystal display device of excellent display quality without deteriorating the alignment and switching characteristics of ferroelectric liquid crystals by the black matrix.

In addition, this black matrix can be easily formed by depositing silicon by vacuum evaporation such as sputtering evaporation and electron-beam evaporation. Further, the film thickness of the black matrix can be easily controlled so that the gap between the surfaces of the black matrix and the transparent electrode is not greater than, for example, 30 nm.

Furthermore, the black matrix is formed between the striped transparent electrodes by forming the ITO film 11 in a striped pattern using the photoresist pattern 12, depositing the silicon film 13 thereon by evaporation without removing the photoresist pattern 12 on the ITO film 11, and then lifting off the photoresist pattern 12. According to such processing steps, displacement of the patterns of the transparent electrodes and the black matrix can never occur.

[Embodiment 2]

The following description will discuss another embodiment of the present invention with reference to FIGS. 3(a) to 3(d). The members having the same function as in Embodiment 1 will be designated by the same code and their description will be omitted.

Figure 3A:
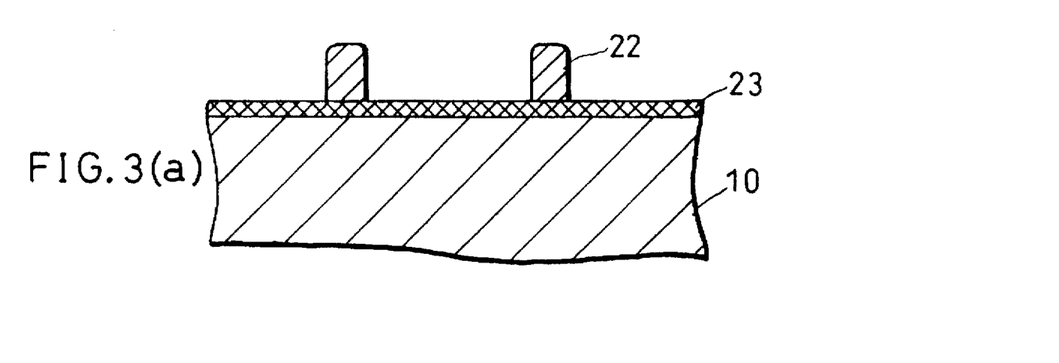
FIGS. 3(a) to 3(d) are cross sections showing the structure of a substrate in a liquid crystal display device of another embodiment of the present invention according to the order of manufacturing steps.

As illustrated in FIG. 3(a), a silicon film 23 with a thickness of 400 nm is formed over the entire surface of the glass substrate 10 by depositing silicon by, for example, electron-beam evaporation. As the silicon, for example, a silicon with 99.999 percent purity produced by Kojundo Chemical Laboratory Co., Ltd. may be used. Next, a photoresist pattern 22 is formed by spincoating a photoresist on the glass substrate 10 and performing photolithography using the photographic mask and ultraviolet-ray exposure device. As the photoresist, for example, TSMR-8800 available from TOKYO OHKA KOGYO Co., Ltd. may be used.

Figure 3B:
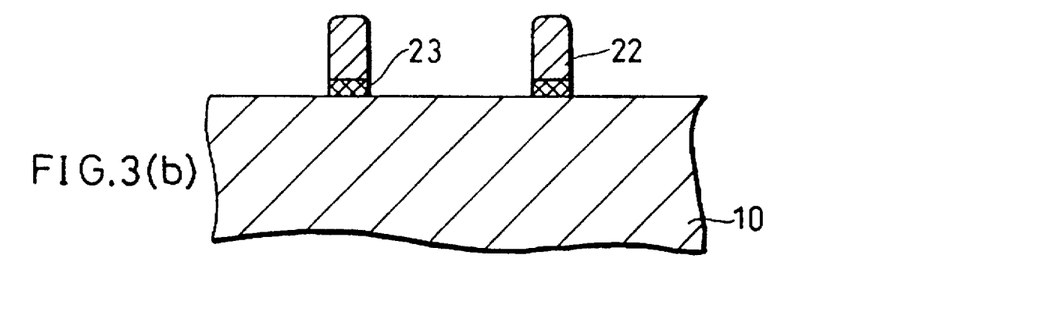

Subsequently, dry etching of the silicon film 23 is performed using a $CF_4$-$O_2$ mixed gas. In this case, the mixing ratio of the mixed gas is $CF_4/O_2=15/7$, and the etching rate is about 20 nm per minute. The silicon film 23 is formed in a striped pattern by the dry etching process.

Figure 3C:
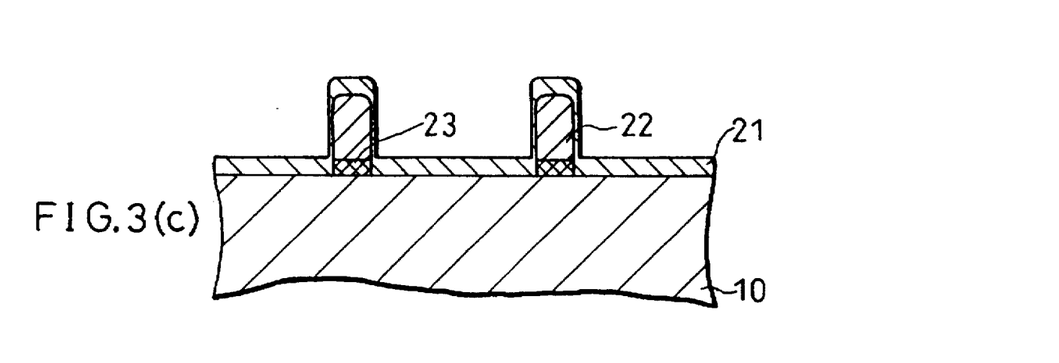

Thereafter, the glass substrate 10 is washed with demineralized water without separating the photoresist pattern 22, and then dried. Next, as shown in FIG. 3(c), by depositing an ITO film 21 in a thickness substantially equal to the thickness of the silicon film 23 by sputtering evaporation or electron-beam evaporation.

Figure 3D:
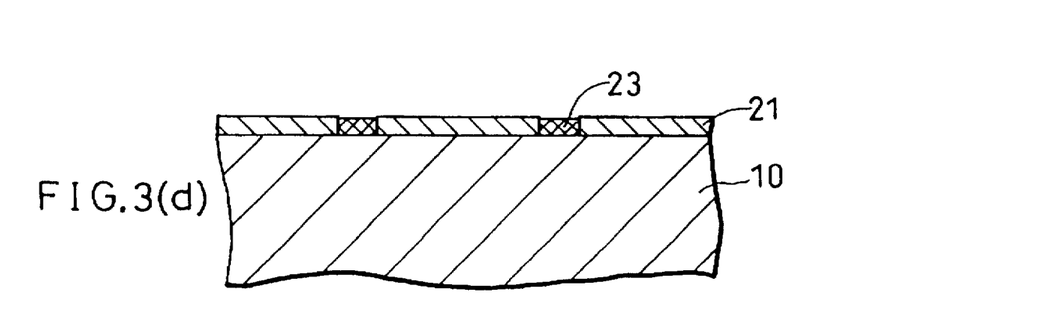

Then, the photoresist pattern 22 and the ITO film 21 thereon are lifted off together by dipping the glass substrate 10 in the aqueous 2-percent sodium hydroxide solution and applying ultrasonic waves. Through the above-mentioned processes, as illustrated in FIG. 3(d), the silicon film 23 as a black matrix is produced between electrodes formed by the ITO film 21 formed in a striped pattern on the glass substrate 10.

Like Embodiment 1, the black matrix formed by the silicon film 23 is arranged not to protrude from the surface of the ITO film 21. Thereafter, a liquid crystal display device is fabricated through the same processing steps as in Embodiment 1.

In this liquid crystal display device, since the non-pixel region is shaded by the black matrix formed by the silicon film 23, it is possible to achieve a uniform display with high contrast. Moreover, since the level of the black matrix is arranged so that the black matrix does not protrude from the surface of the ITO film 21, the black matrix does not deteriorate the alignment and switching characteristics of ferroelectric liquid crystals.

In addition, since the silicon film 23 has insulating effects, it is possible to prevent the occurrence of a leakage current between the transparent electrodes formed by the ITO film 21 and deterioration of the driving characteristics of the liquid crystal display device.

Further, this black matrix can be easily formed by depositing silicon by vacuum evaporation such as sputtering evaporation and electron-beam evaporation. Furthermore, the film thickness of the black matrix can be easily controlled so that the gap between the surfaces of the black matrix and the transparent electrodes is not greater than, for example, 30 nm.

Besides, the black matrix is formed between the striped transparent electrodes by forming the silicon film 23 in a striped pattern using the photoresist pattern 22, depositing the ITO film 21 thereon without removing the photoresist pattern 22 on the silicon film 23, and then lifting off the photoresist pattern 22. According to such processing steps, displacement of the patterns of the transparent electrodes and the black matrix can never occur.

[Embodiment 3]

A liquid crystal display device is fabricated in the same conditions as in Embodiment 1 except that a silicon-germanium solid solution is used instead of silicon used as a material for the black matrix in Embodiment 1. In this liquid crystal display device, the non-pixel region is shaded by the black matrix made of silicon-germanium, thereby exhibiting the same effects as those of the above-mentioned embodiments.

The following description will discuss comparative examples for the purpose of comparison with the above-mentioned respective embodiments.

[Comparative Example 1]

A liquid crystal display device was fabricated in the same conditions as in Embodiment 1 except that germanium was used as the material for the black matrix. As germanium, for example, a germanium with 99.999 percent purity available from Kojundo Chemical Laboratory Co., Ltd. may be used.

An electrical short circuit was caused between the ITO electrodes on one of opposing substrates in the liquid crystal display device, and a short circuit was also caused between the ITO electrodes on the other substrate in the same manner. When the liquid crystal display device was driven in this state, a uniform display with high contrast was exhibited because the non-pixel region was shaded by the black matrix like Embodiment 1. However, it was impossible to vary the display state of each pixel due to a leakage current occurred between adjacent ITO electrodes. The leakage current occurred because the resistivity of germanium as the black matrix placed between the ITO electrodes is four figures smaller than that of silicon.

[Comparative Example 2]

Figure 4A:
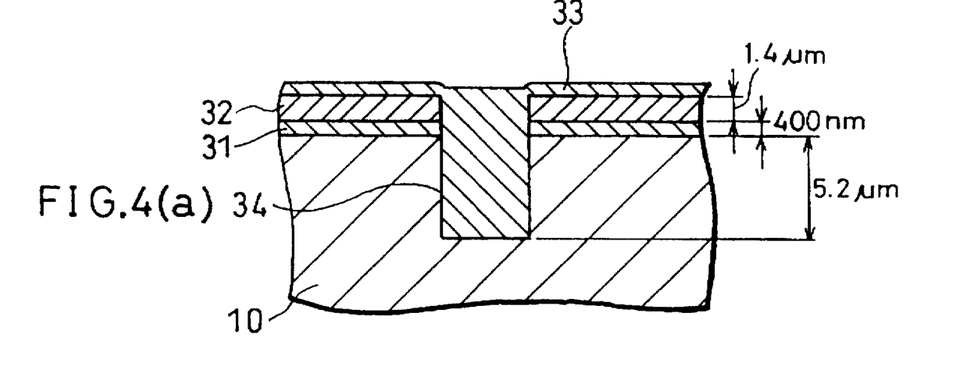
FIGS. 4(a) to 4(c) are cross sections showing the structure of a substrate in a conventional liquid crystal display device as comparative examples according to the order of manufacturing steps.
Figure 4B:
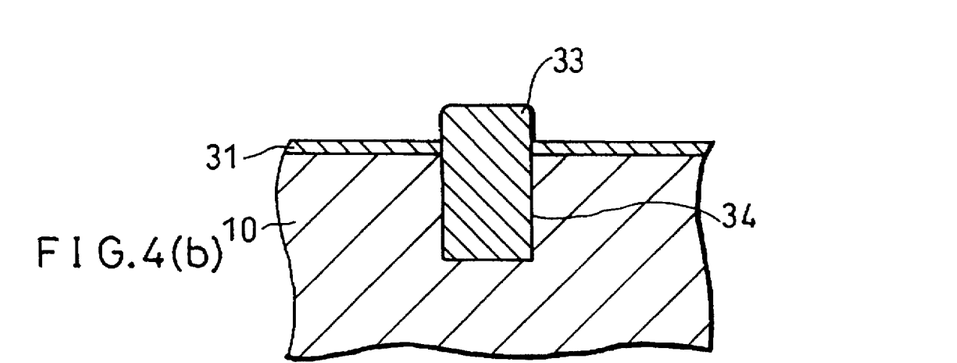
Figure 4C:
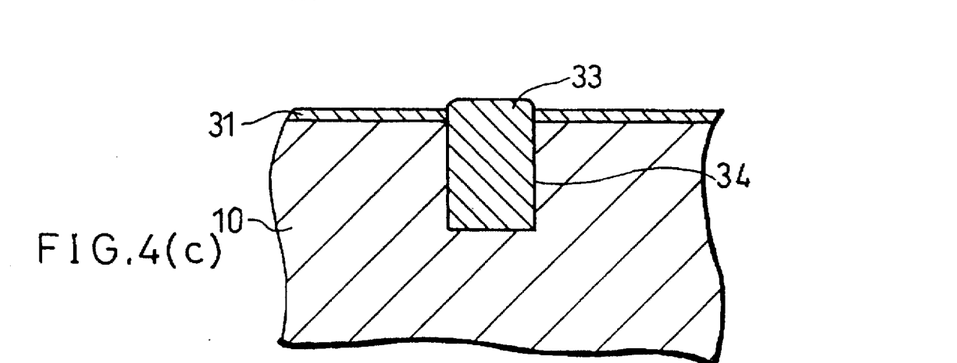

Referring now to FIGS. 4(a) to 4(c), the following description will discuss another comparative example.

ITO electrodes 31 were formed on the surface of the glass substrate 10 in the same manner as in Embodiment 1, and a slot 34 with a depth of 5.2 μm from the surface of the glass substrate 10 was produced by etching the glass substrate 10 with hydrofluoric acid as disclosed in Japanese Publication for Unexamined Patent Application (Tokukaihei) No. 3-223810. In Embodiment 1, silicon is used as a material for the black matrix and silicon is deposited using the electron-beam evaporation device. In contrast, in this comparative example, a black polymer (Black Matrix DARC produced by Messrs Brever Science Co., Ltd.) was used in the following manner. A condensate of the black polymer was poured over the entire surface of the glass substrate 10, dried after removing excessive polymer with a rubber roller, and then underwent a preliminary curing process at 130° C. As a result, as shown in FIG. 4(a), a black polymer 33 was placed in the slot 34 of the glass substrate 10 and on the surface of the photoresist 32.

Subsequently, like Embodiment 1, the photoresist 32 and the black polymer 33 thereon were lifted off together, and then the glass substrate 10 having the ITO electrodes 31 and the black polymer 33 was heated at 250° C. for one hour. The level of the surface of the black polymer 33 immediately after lifted off with respect to the surface of the ITO electrodes 31 was substantially equal to the thickness of the photoresist 32 before removed. In this case, the entire thickness of the black polymer 33 was equal to the sum of the thickness of the photoresist 32 before removed (about 1.4 μm in this example), the thickness of the ITO electrode 31 (400 nm), and the depth of the slot 34 (5.2 μm).

The black polymer 33 was shrank by about 20 percent during the one-hour heating at 250° C. After heating in the above-mentioned conditions, a gap of not less than 100 nm was produced between the surfaces of the black polymer 33 and the ITO electrodes 31 as shown in FIG. 4(c). In order to control the thickness of the black polymer 33 to eliminate the gap between the surfaces of the black polymer 33 and the ITO electrodes 31, it is necessary to accurately control the thickness of the photoresist 32 and the depth of the slot 34. Moreover, it is necessary to take the shrinkage of the black polymer 33 during the heating process into consideration. Therefore, it is extremely difficult to control the gap between the surfaces of the black polymer 33 and the ITO electrodes 31 to be always not greater than 50 nm with precision.

In this comparative example, the depth of the slot 34 was set to 5.2 μm. This value was determined by backward calculation based on the values of the thickness of the ITO electrode 31, the thickness of the photoresist 32, and etc. so as to make the surface level of the black polymer 33 after shrinkage be as close as possible to the surface level of the ITO electrode 31. However, the resultant depth of the slot 34 was unnecessarily thick in consideration of the light blocking properties of the black polymer 33. Even considering the use of silicon, the resultant thickness was as great as ten times or more of a thickness required for shading.

An insulating film and an alignment film were successively layered on the substrate whereupon the black matrix was formed by the black polymer 33, and a uniaxial alignment process was performed by rubbing the alignment film. By placing another piece of substrate fabricated in the same manner as above to face the above-mentioned substrate and injecting ferroelectric liquid crystals therebetween, a liquid crystal display device of Comparative Example 2 was fabricated.

It was known from a comparison between the liquid crystal display device fabricated in Comparative Example 2 and that of Embodiment 1 that the liquid crystal display device of Comparative Example 2 sufficiently shaded the non-pixel region by the black matrix but showed deterioration in the contrast due to disorderly alignment that occurred in the periphery of pixel regions.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A liquid crystal display element comprising:
   a pair of transparent substrates respectively including a plurality of parallel transparent electrodes;
   a ferroelectric liquid crystal sandwiched between said pair of transparent substrates; and
   a thin film layer formed by silicon to cover spaces between adjacent transparent electrodes on a surface of said transparent substrate.

2. The liquid crystal display element as set forth in claim 1,
   wherein a surface level of said thin film layer with respect to the surface of said transparent substrate is not higher than a surface level of said transparent electrode with respect to the surface of said transparent substrate.

3. A liquid crystal display element comprising:
   a pair of transparent substrates respectively including a plurality of parallel transparent electrodes;
   a ferroelectric liquid crystal sandwiched between said pair of transparent substrates; and
   a thin film layer formed by a silicon-germanium solid solution to cover spaces between adjacent transparent electrodes on a surface of said transparent substrate.

4. The liquid crystal display element as set forth in claim 3,
   wherein a surface level of said thin film layer with respect to the surface of said transparent substrate is not higher than a surface level of said transparent electrode with respect to the surface of said transparent substrate.

5. A process for fabricating a liquid crystal display element, comprising steps:
   (a) forming a transparent electrode material film on a transparent substrate;
   (b) forming an electrode pattern on said electrode material film by a photoresist;
   (c) forming electrodes by etching;
   (d) forming a silicon film on said transparent substrate having said electrodes with said photoresist remaining thereon; and
   (e) removing said photoresist together with said silicon film thereon.

6. The process for fabricating a liquid crystal display element as set forth in claim 5,
   wherein said step (d) includes depositing silicon by evaporation on said transparent substrate whereupon said electrodes are formed.

7. The process for fabricating a liquid crystal display element as set forth in claim 5, further comprising thinning said silicon film so as not to protrude from a surface of said electrodes after said step (e).

8. A liquid crystal display element fabricated by the process as set forth in claim 5, comprising:
   a pair of transparent substrates respectively having at least said electrodes and said silicon film; and
   a ferroelectric liquid crystal placed in a space between said pair of transparent substrates fastened.

9. A process for fabricating a liquid crystal display element, comprising steps:
   (a) forming a transparent electrode material film on a transparent substrate;
   (b) forming an electrode pattern on said electrode material film by a photoresist;
   (c) forming electrodes by etching;
   (d) forming a silicon-germanium solid solution film on said transparent substrate having said electrodes with said photoresist remaining thereon; and
   (e) removing said photoresist together with said silicon-germanium solid solution film thereon.

10. The process for fabricating a liquid crystal display element as set forth in claim 9,
    wherein said step (d) includes depositing a silicon-germanium solid solution by evaporation on said transparent substrate whereupon said electrodes are formed.

11. The process for fabricating a liquid crystal display element as set forth in claim 9, further comprising thinning said silicon-germanium solid solution film so as not to protrude from a surface of said electrodes after said step (e).

12. A liquid crystal display element fabricated by the process as set forth in claim 9, comprising:

a pair of transparent substrates respectively having at least said electrodes and said silicon-germanium solid solution film; and a ferroelectric liquid crystal placed in a space between said pair of transparent substrates fastened.

13. A process for fabricating a liquid crystal display element, comprising the steps of:

(a) forming a silicon film on a transparent substrate;

(b) forming a black matrix pattern on said silicon film by a photoresist;

(c) forming a black matrix by etching;

(d) forming a transparent electrode material film on said transparent substrate having said black matrix with said photoresist remaining thereon; and (e) removing said photoresist together with said electrode material film thereon.

14. The process for fabricating a liquid crystal display element as set forth in claim 13, wherein said step (d) includes depositing an electrode material by evaporation on said transparent substrate whereupon said black matrix is formed.

15. The process for fabricating a liquid crystal display element as set forth in claim 13, further comprising thinning said black matrix so as not to protrude from a surface of said electrodes after said step (e).

16. A liquid crystal display element fabricated by the process as set forth in claim 13, comprising:

a pair of transparent substrates respectively having at least said electrodes and black matrix; and a ferroelectric liquid crystal placed in a space between said pair of transparent substrates fastened.

17. A process for fabricating a liquid crystal display element, comprising the steps of:

(a) forming a silicon-germanium solid solution film on a transparent substrate;

(b) forming a black matrix pattern on said silicon-germanium solid solution film by a photoresist;

(c) forming a black matrix by etching;

(d) forming a transparent electrode material film on said transparent substrate having said black matrix with said photoresist remaining thereon; and (e) removing said photoresist together with said electrode material film thereon.

18. The process for fabricating a liquid crystal display element as set forth in claim 17.

wherein said step (d) includes depositing an electrode material by evaporation on said transparent substrate whereupon said black matrix is formed.

19. The process for fabricating a liquid crystal display element as set forth in claim 17, further comprising thinning said black matrix so as not to protrude from a surface of said electrodes after said step (e).

20. A liquid crystal display element fabricated by the process as set forth in claim 17, comprising:

a pair of transparent substrates respectively having at least said electrodes and black matrix; and a ferroelectric liquid crystal placed in a space between said pair of transparent substrates fastened.

* * * * *